Dec. 19, 1967 S. MANETTA 3,358,418
PACKAGING MACHINE
Filed April 7, 1965 2 Sheets-Sheet 1
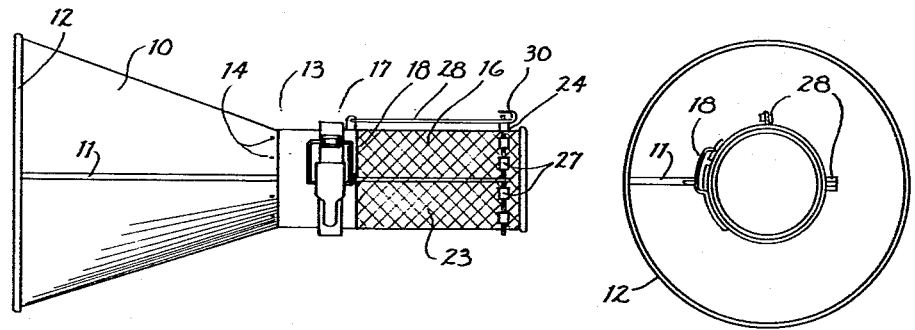
Fig. 1
Fig. 2
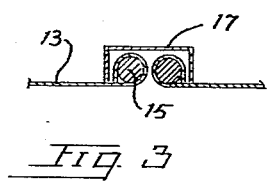
Fig. 3
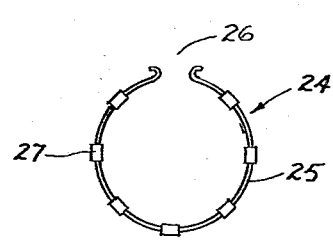
Fig. 4
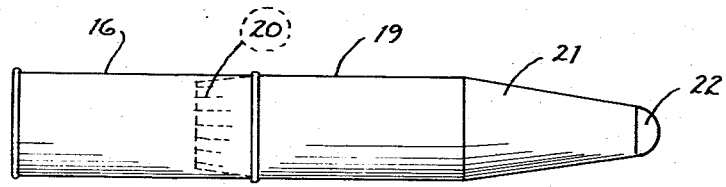
Fig. 5
INVENTOR
Sam Manetta Dec. 19, 1967     S. MANETTA     3,358,418

PACKAGING MACHINE

Filed April 7, 1965     2 Sheets-Sheet 2

INVENTOR
Sam Manetta

United States Patent Office 3,358,418
Patented Dec. 19, 1967

3,358,418
PACKAGING MACHINE
Sam Manetta, Box 10,
Pontypool, Ontario, Canada
Filed Apr. 7, 1965, Ser. No. 446,235
3 Claims. (Cl. 53—124)

ABSTRACT OF THE DISCLOSURE

A tree packaging device having a cone shaped member and tubular member through which the tree is drawn, the tubular member serving to support resilient mesh material which is drawn over the tree as it emerges from the tubular member and means for retarding the flow of the material as it is drawn over the tree.

This invention relates to new and useful improvements in packaging device particularly of the type used in packaging nursery stocks such as small trees, shrubs, etc.

Broadly, the invention comprises a cone shaped member detachably secured to a tubular member covered with a plastic meshing. A small tree, such as a Christmas tree or shrub is pushed, butt end first, through the large opening of the cone shaped member and pulled through the tubular member. The purpose of this is to fold the branches against the tree. A tubular resilient plastic meshing mounted over the tubular member covers the entire branch area and retains them in a folded position for shipping purposes.

Prior to my invention, nursery stock, particularly Christmas trees, were shipped as they were cut and packed in trucks or trailers with all the branches exposed and free to bend in any direction when additional trees were packed over. This resulted in several branches being broken or bent completely out of shape.

In order to avoid such extensive damage I have devised the present invention which will serve a twofold purpose. It will protect the trees from extensive damage and will require much less space so that a greater number of trees can be packed in a truck load.

The primary object of the present invention is therefore to devise and construct a packaging device for trees and the like which in a single operation will fold the branches against the tree and cover the tree with a flexible resilient material.

Another important object is to considerably reduce the size of the trees to be shipped so that a greater number of trees can be shipped in one load.

Still another object is to protect trees and nursery stock in general from branch breakage and other related damages during the shipping process.

Still another object is to provide a detachably secured tubular member loaded with the resilient flexible material with which the tree is covered for shipping purposes.

Another object is to provide an additional device hereinafter called a nose cone to facilitate the loading of the tubular member with the flexible resilient material.

Other apparent objects are the provision of a strong and durable device which is easy and efficient in operation and relatively inexpensive to produce.

With these and other objects in view that may appear as the description proceeds, the invention consists in the novel arrangement of co-operating elements as hereinafter more specifically set forth, claimed and shown in the accompanying drawing forming part of this application and in which:

FIGURE 1 is a side elevational view of a packaging device constructed in accordance with the present invention.

FIGURE 2 is an end elevational view of FIGURE 1.

FIGURE 3 is a cross sectional view of the joint between the cone shaped member and the tubular member showing the retaining ring securing both extremities.

FIGURE 4 is a detailed view of the retarder used to retard the flow of the covering material used to hold the branches in a folded position when the tree is pulled through the packaging device.

FIGURE 5 is a side elevational view of the loading cone.

Figure 6:
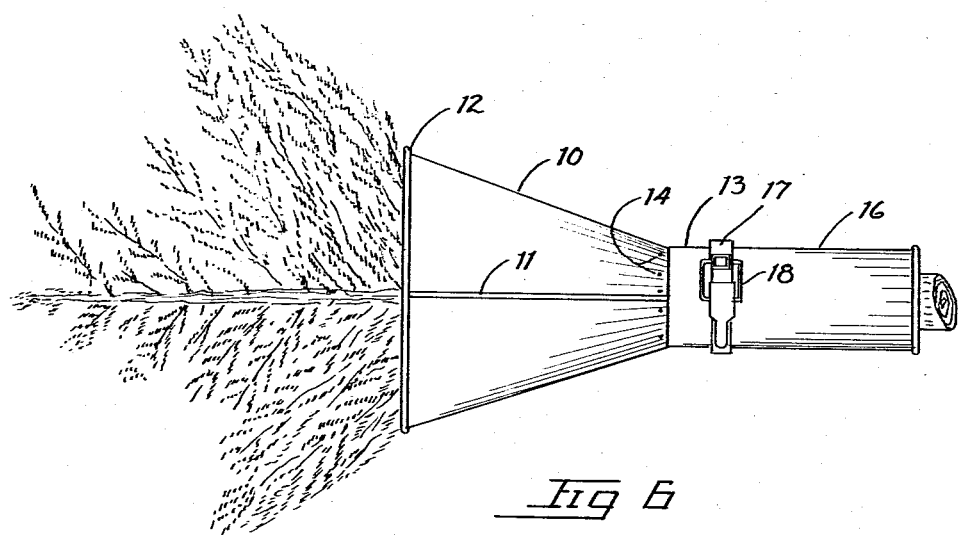
FIGURE 6 shows a tree being pulled through the device.

Referring more in detail to the drawing in which similar reference characters designate corresponding parts throughout the several views, it will be seen the invention comprises a cone shaped member 10 the lateral ends of which are joined together and form a seam 11 of the type generally used when forming stove pipe and the like. The outer or large extremity 12 of the cone is reinforced by means of a rod which is rolled at the said outer edge. At its smaller end a short tubular member 13 is secured to the said cone by means of rivets 14. The free end of said member 13 is also reinforced by means of a rod 15 as shown in FIGURE 3 of the drawing. A long tubular member 16 having both its extremities reinforced by means of a rod is secured to the cone assembly by means of a U-shaped belt 17 formed with a buckle, of the tool chest type, that is one which is formed with a link 18 which pulls the extremities of the belt together when the buckle is closed. To prevent the tubular member from separating from the cone assembly during the operation of the device the U-shaped belt engages the butting rings in FIGURE 3 of the drawing.

To cover the trees, as hereinafter explained, the resilient meshing material is loaded on the tubular member 16. In order to load the said tubular member, I provide a nose cone which consists of a tubular member 19 having its inner end 20 crimped to facilitate the introduction thereof in a tubular member 16. The outer extremity is in the form of a tapered tube 21 and a semi-spherical end piece 22 all secured to each other by means of well known methods. A number of tubular members 16 are provided with the invention so that as little time as possible is lost during the operation.

The transparent resilient material 23 used to cover the tree is in tubular form and must be loaded on said tubular member 16. After the nose cone is secured to a tubular member 16 as illustrated in FIGURE 5 of the drawing, the material 23 is pushed over the nose cone on to the tube 16 until a sufficient quantity is applied thereon so that several trees can be packaged before it is necessary to change said member 16 for one which has been loaded.

Figure 7:
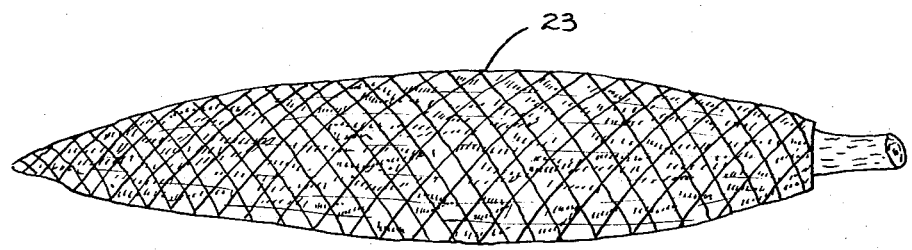
FIGURE 7 shows the end result, that is a tree having its branches folded along the tree and completely covered with the resilient material used in the present instance.

When pulling a tree through the device as shown in FIGURE 6, the tree is pulled through until the first branches appear at which time the material 23 is also pulled back so that as the tree is pulled through, the material covers all the branches. The material is cut when the tree has been completely pulled through. The material has a tendency to be loose over the tree when it is pulled through. In order to prevent this I provide a retarder 24 which comprises a spring steel ring 25 having open ends bent back on themselves at 26 and a plurality of rollers 27 disposed at spaced apart intervals. The retarder causes a drag on the feed of the material over the tree and causes it to be well stretched such as shown in FIGURE 7 of the drawings. To prevent the retarder from rolling off the rear extremity of the device, I provide a plurality of hooks 28 having one of their ends fastened to the cone and a hook 30 at the opposite end to engage the steel ring 25 at a point between a pair of rollers 27.

When a tree has been pulled through the device as set forth herein the branches are folded against the tree trunk, and are entirely covered as illustrated in FIGURE 7 of the drawing.

It is easily understood that trees and nursery stock packed in this manner are less apt to be damaged during transportation and that a much greater number of trees can be shipped per load.

It is believed that the construction and advantages have been fully set forth and that further detailed description is not required.

While the preferred embodiment has been disclosed it is to be understood that minor modifications may be resorted to without departing from the spirit of the invention, and the scope of the claims.

The embodiments of the invention in which an exclusive property or privilege is claimed are defined as follows.

I claim:

1. A tree packaging device comprising a cone shaped member, a short tubular member secured to the small extremity of said cone, the outer extremity of said cone and the free extremity of said small tubular member being reinforced by means of a rod rolled around said ends, a long tubular member having both extremities formed with a reinforcing rod adapted to hold a supply of resilient mesh material thereon, a U-shaped locking ring to secure said long tubular member to said short tubular member, and a spring steel ring surrounding said long tubular member having a plurality of rollers mounted thereon in spaced apart relation adapted to retard the flow of said material over the tree when the tree is drawn through said long tubular member.

2. A tree packaging device as described in claim 1 including a series of hooks having one end attached to said short tubular member and their opposite ends engaged with said ring.

3. A tree packaging device as described in claim 1 including means for mounting said material over said long tubular member comprising a tube having a crimped end adapted to be inserted in the end of said long tubular member, the opposite end of said tube being tapered and terminating in a semi-spherical head.

References Cited

UNITED STATES PATENTS

| 984,086 | 2/1911 | Graham | 285—410 |
|---|---|---|---|
| 1,913,828 | 6/1933 | Brennan | 53—255 |

FOREIGN PATENTS 691,653   5/1953   Great Britain.

ROBERT C. RIORDON, *Primary Examiner.*

R. ALVEY, *Assistant Examiner.*